US008976722B2

(12) United States Patent
Song

(10) Patent No.: US 8,976,722 B2
(45) Date of Patent: Mar. 10, 2015

(54) MANAGING TRANSMISSION PROTOCOLS FOR GROUP COMMUNICATIONS WITHIN A WIRELESS COMMUNICATIONS NETWORK

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 867 days.

(21) Appl. No.: 12/338,720

(22) Filed: Dec. 18, 2008

(65) Prior Publication Data

US 2010/0157869 A1 Jun. 24, 2010

(51) Int. Cl.
H04H 20/71 (2008.01)
G06F 15/173 (2006.01)
H04W 72/00 (2009.01)
H04L 12/18 (2006.01)

(52) U.S. Cl.
CPC ........... H04W 72/005 (2013.01); *H04L 12/189* (2013.01)
USPC .......................................... 370/312; 709/226

(58) Field of Classification Search
USPC ......... 370/312, 390, 432, 473, 328, 329, 338, 370/465, 466, 230, 230.1, 231, 235, 236
See application file for complete search history.

(56) References Cited

U.S. PATENT DOCUMENTS

| 7,631,080 | B2 * | 12/2009 | Epstein et al. ................. 709/226 |
| 2008/0084878 | A1 | 4/2008 | Akbar et al. |
| 2008/0170550 | A1 | 7/2008 | Liu et al. |
| 2008/0170570 | A1 * | 7/2008 | Moskaluk et al. ............ 370/390 |
| 2008/0232373 | A1 * | 9/2008 | Iyer et al. ...................... 370/392 |

FOREIGN PATENT DOCUMENTS

| EP | 1335522 | | 8/2003 |
| JP | 2003258860 | A | 9/2003 |
| JP | 2006526316 | A | 11/2006 |
| JP | 2008148350 | | 6/2008 |
| JP | 2009509461 | A | 3/2009 |
| JP | 2009531889 | A | 9/2009 |
| KR | 1011651 | | 1/2011 |
| WO | 2007037923 | A2 | 4/2007 |
| WO | 2007112801 | A1 | 10/2007 |

OTHER PUBLICATIONS

International Search Report, PCT/US2009/068809, International Searching Authority, European Patent Office, Mar. 29, 2010.
Written Opinion, PCT/US2009/068809, International Searching Authority, European Patent Office, Mar. 29, 2010.
International Preliminary Report on Patentability—PCT/US2009/068809, The International Bureau of WIPO—Geneva, Switzerland, Apr. 4, 2011.

* cited by examiner

*Primary Examiner* — Afshawn Towfighi
(74) *Attorney, Agent, or Firm* — Michael F. Taveira

(57) ABSTRACT

Apparatuses and methods for managing transmission protocols for group communications are disclosed. In an example, an access network receives a forward link packet having a first transmission protocol, the forward link packet associated with a given group communication session. The access network determines whether the first transmission protocol is acceptable. The access network selects a second transmission protocol, if the determining step determines the first transmission protocol is not acceptable. The access network transmits the forward link packet in accordance with the second transmission protocol (e.g., by mapping the packet between transmission protocols at the access network).

29 Claims, 7 Drawing Sheets

MANAGING TRANSMISSION PROTOCOLS FOR GROUP COMMUNICATIONS WITHIN A WIRELESS COMMUNICATIONS NETWORK

BACKGROUND OF THE INVENTION

1. Field of the Invention

The invention relates to communications in a wireless telecommunication system and, more particularly to methods of managing transmission protocols for multicast communications within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiment of the invention include apparatuses and methods for managing transmission protocols for group communications. In an example, an access network receives a forward link packet (e.g., from an application server) having a first transmission protocol (e.g., multicast, unicast, etc.), the forward link packet associated with a given group communication session. The access network determines whether the first transmission protocol is acceptable. The access network selects a second transmission protocol (e.g., unicast, multicast, etc.) if the determining step determines the first transmission protocol is not acceptable. The access network transmits the forward link packet in accordance with the second transmission protocol (e.g., by mapping the packet between transmission protocols at the access network, by prompting an access terminal to request the application server adjust its transmission protocol, etc.). In another example, an access terminal that wishes to participate in the given group communication session receives, from the access network, a prompt to request the application server to adjust a transmission protocol for one or more group communication messages intended for at least the access terminal. The access terminal transmits, in response to the prompt, a request that the application server adjust the transmission protocol.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
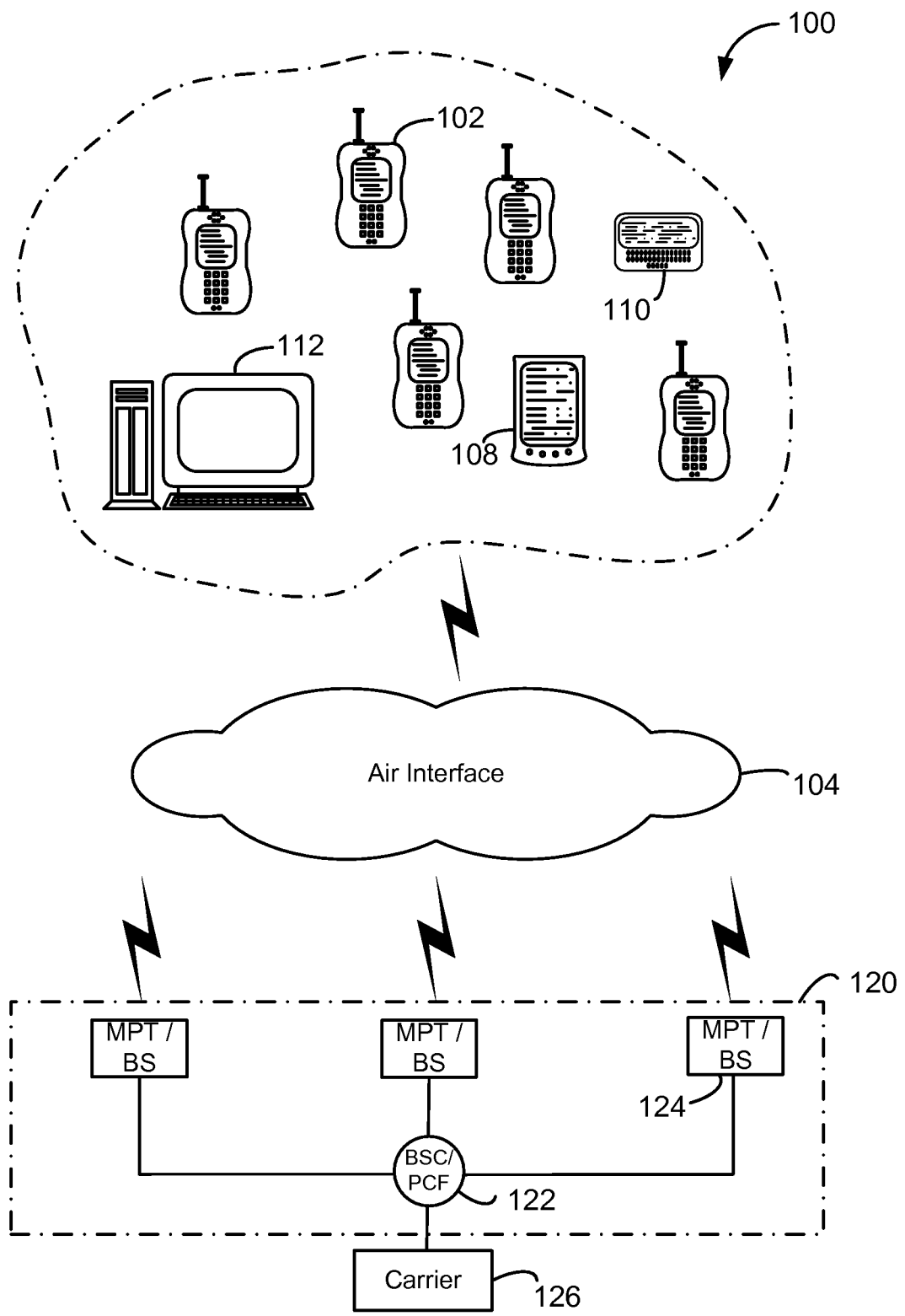
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
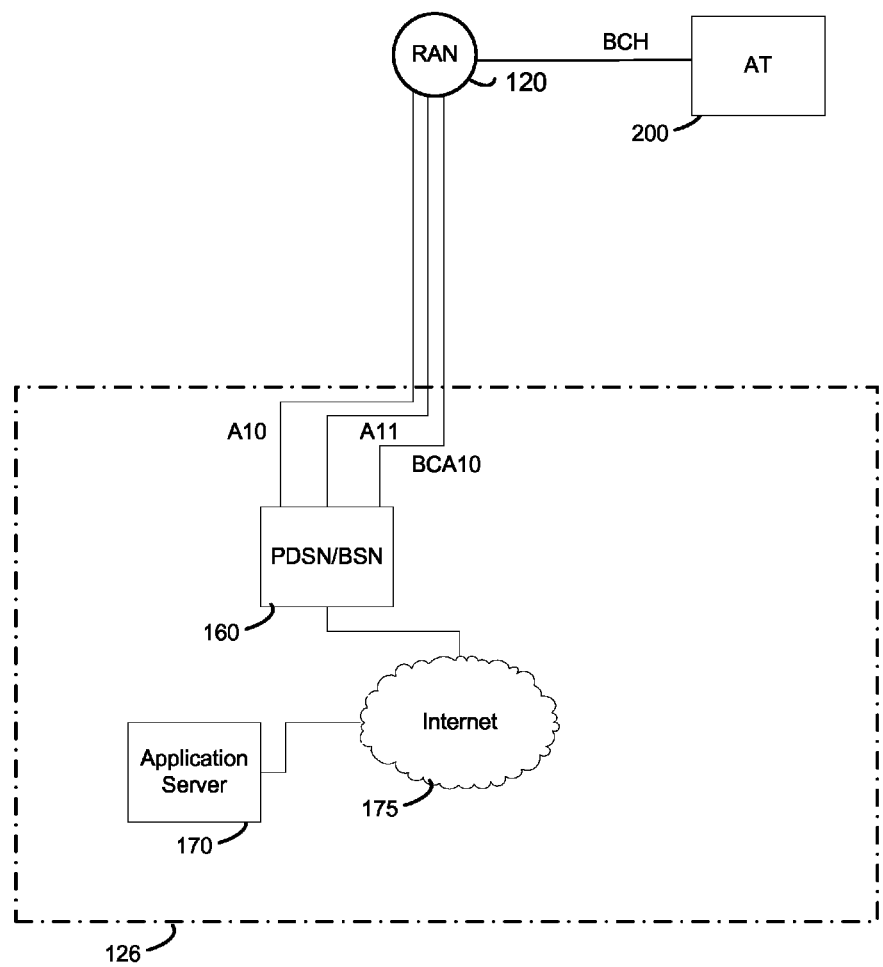
FIG. 2 illustrates a carrier network according to an embodiment of the invention.

FIG. 2 illustrates the carrier network 126 according to an embodiment of the invention. In the embodiment of FIG. 2, the carrier network 126 includes a packet data serving node (PDSN) 160 that includes an integrated broadcast service node (BSN) 165, an application server 170 and an Internet 175. However, application server 170 and other components may be located outside the carrier network in alternative embodiments. Further, while the PDSN 160 is illustrated in FIG. 2 as being integrated with the BSN, it will be appreciated that other embodiments of the invention are directed to a separately-implemented BSN that need not be integrated with the PDSN 160.

Referring to FIG. 2, the PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 data connection and/or a conventional A11 signaling connection. The A10 and A11 connections are well-known in the art and will not be described further for the sake of brevity.

Referring to FIG. 2, the BSN, which may be integrated with the PDSN 160, may be configured to support multicast and broadcast services. The BSN communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 can send both unicast messaging and multicast messaging to the PDSN/BSN 160 via the Internet 175.

Generally, as will be described in greater detail below, the RAN 120 transmits multicast messages, received from the PDSN/BSN 160 via the BCA10 connection, over the air interface 104 via a downlink channel (e.g., a broadcast channel (BCH), a control channel, etc.) to one or more access terminals 200.

Figure 3:
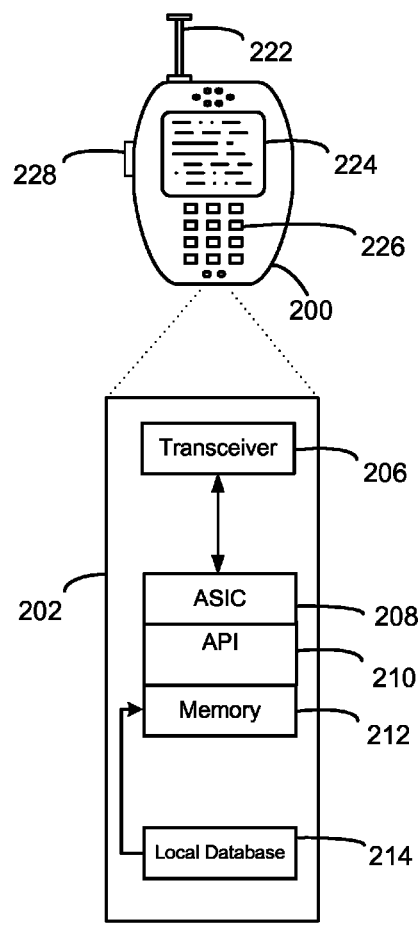
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet 175, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
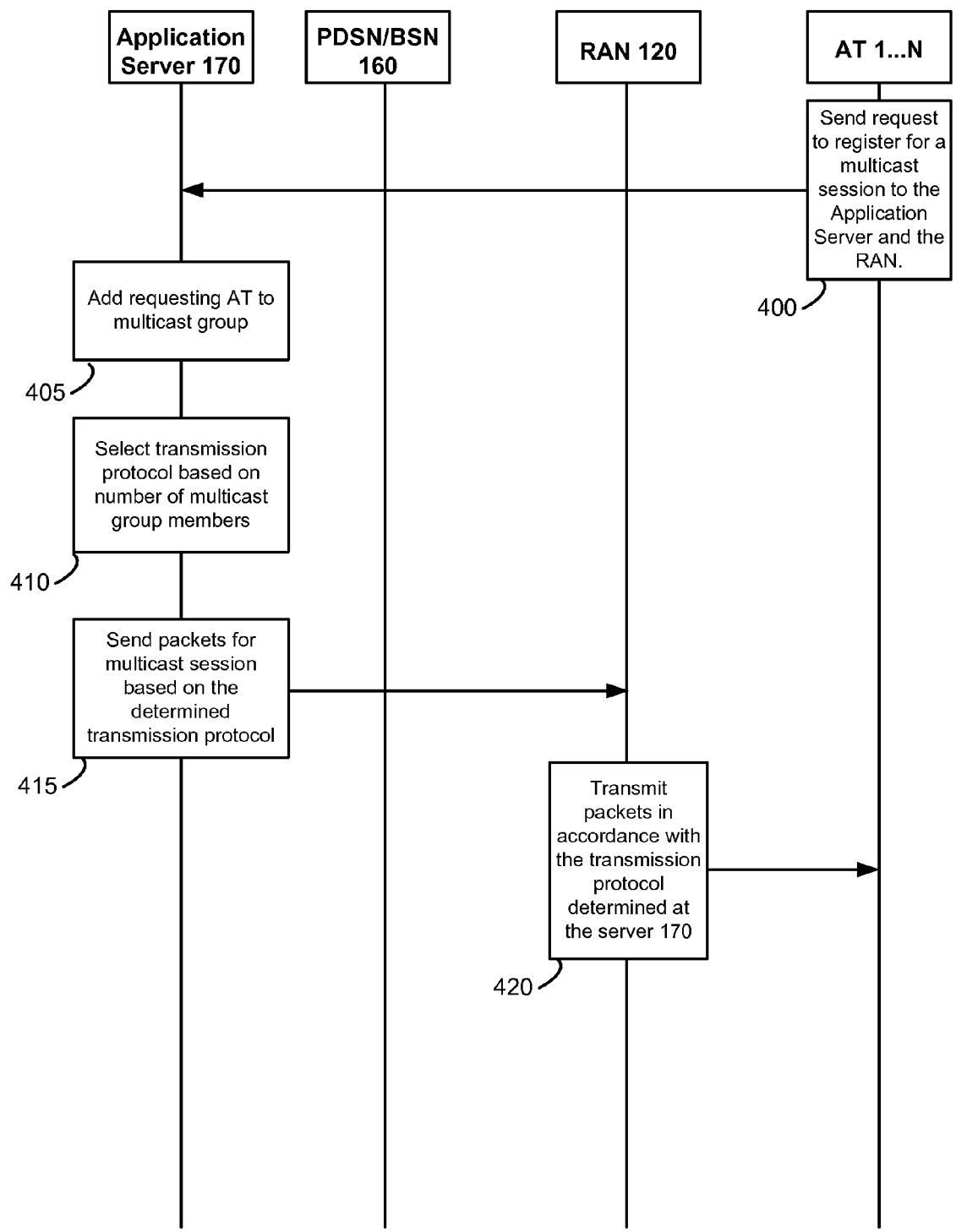
FIG. 4 illustrates a conventional process for providing a group communication service to one or more ATs in the wireless system of FIG. 1.

FIG. 4 illustrates a conventional process for providing a group communication service to one or more ATs 1 . . . N in the wireless system 100 of FIG. 1. In 400, ATs 1 . . . N sends a request to register to an interested multicast session to the Application Server 170. One or more of ATs 1 . . . N also send a registration message (e.g., a BCMCSFlowRegistration message) to the RAN 120 to indicate their interest in the multicast session. The application server 170 adds the requesting AT to the multicast group, 405.

In 410, the application server 170 selects a transmission protocol for the announced multicast session. The transmission protocol is selected based on the number of multicast group members within the multicast group after the multicast group is updated in 405. If the number of registered multicast group members is below a pre-defined threshold, the application server 170 selects unicasting as a transmission protocol. Otherwise, if the number of registered multicast group members is equal to or above the pre-defined threshold, the application server 170 selects multicasting as a transmission protocol. Thus, if relatively few multicast group members are present within the multicast group, the application server 170 need not undertake the overhead associated with multicast messaging, and may instead send individual unicast messages to the multicast group members. Alternatively, if a high number of multicast group members are present within the multicast group, the application server 170 can determine that the overhead associated with multicast messaging is outweighed by expected efficiencies.

It should be noted that the above described application server's 170 transmission protocol selection algorithm describes a relatively simple algorithm that always selects multicasting as a transmission protocol regardless of the number of registered group members. This can be achieved by setting the pre-defined threshold to zero. On the other hand, the application server 170 can alternatively select unicasting as a transmission protocol regardless of the number of registered group members by setting the pre-defined threshold to a very large number.

After determining the transmission protocol in 410, the application server 170 provides packets (e.g., unicast packets, multicast packets, etc.) associated with the multicast session to the PDSN/BSN 160 in accordance with the selected transmission protocol, 415, (e.g., as unicast packets if the number of group members is low, as multicast packets if the number of group members is high, etc.), and the PDSN/BSN 160 sends the packets associated with the announced multicast session to the RAN 120 (e.g., over an A10 connection if unicast is selected and BCA10 connection if multicast is selected). For unicast packets, the PDSN/BSN 160 sends the packets to BSCs where the individual ATs are located, and instructs those BSCs at the RAN 120 to transmit the packets to the multicast group members based on their AT IDs. For multicast packets, the PDSN/BSN 160 sends the packets to BSCs from which multicast registration requests have been received, and instructs those BSCs at the RAN 120 to transmit the packets to the multicast group members based on the registered multicast session ID (e.g., BCMCSFlowID). Thus, the RAN 120 (e.g., BSC 122 and potentially other BSCs as well) receives the packets from the PDSN/BSN 160 (e.g., over the BCA10 connection if multicast is selected in 410), and transmits the packets to one or more multicast group members via the air interface 104 in accordance with the selected transmission protocol determined at the application server 170.

As will be appreciated by one of ordinary skill in the art, the RAN 120 typically does not play a role in determining the manner in which packets associated with a multicast session are transmitted. Instead, this determination is conventionally performed at the application server 170. In part, this is because the RAN 120 is not conventionally aware of multicast group associations of access terminals within the wireless communications system 100.

Further, the application server 170 determines the transmission protocol for multicast sessions based only upon the total number of multicast group members in the multicast group. The application server 170 does not, for example, take into account the relative locations of individual multicast group members because the locations of individual access terminals is maintained at the RAN 120, and not the application server 170.

As will now be described with respect to FIGS. 5 through 7, embodiments of the invention are directed to improving an efficiency of wireless communication by taking into account, at a radio access network, of both (i) the multicast group associations of multicast group members or target ATs and (ii) multicast group member location criteria (e.g., geographic locations of access terminals in a multicast group, current serving sectors of access terminals in a multicast group, etc.) in determining the manner in which packets associated with a multicast session are transmitted to multicast group members.

Figure 5:
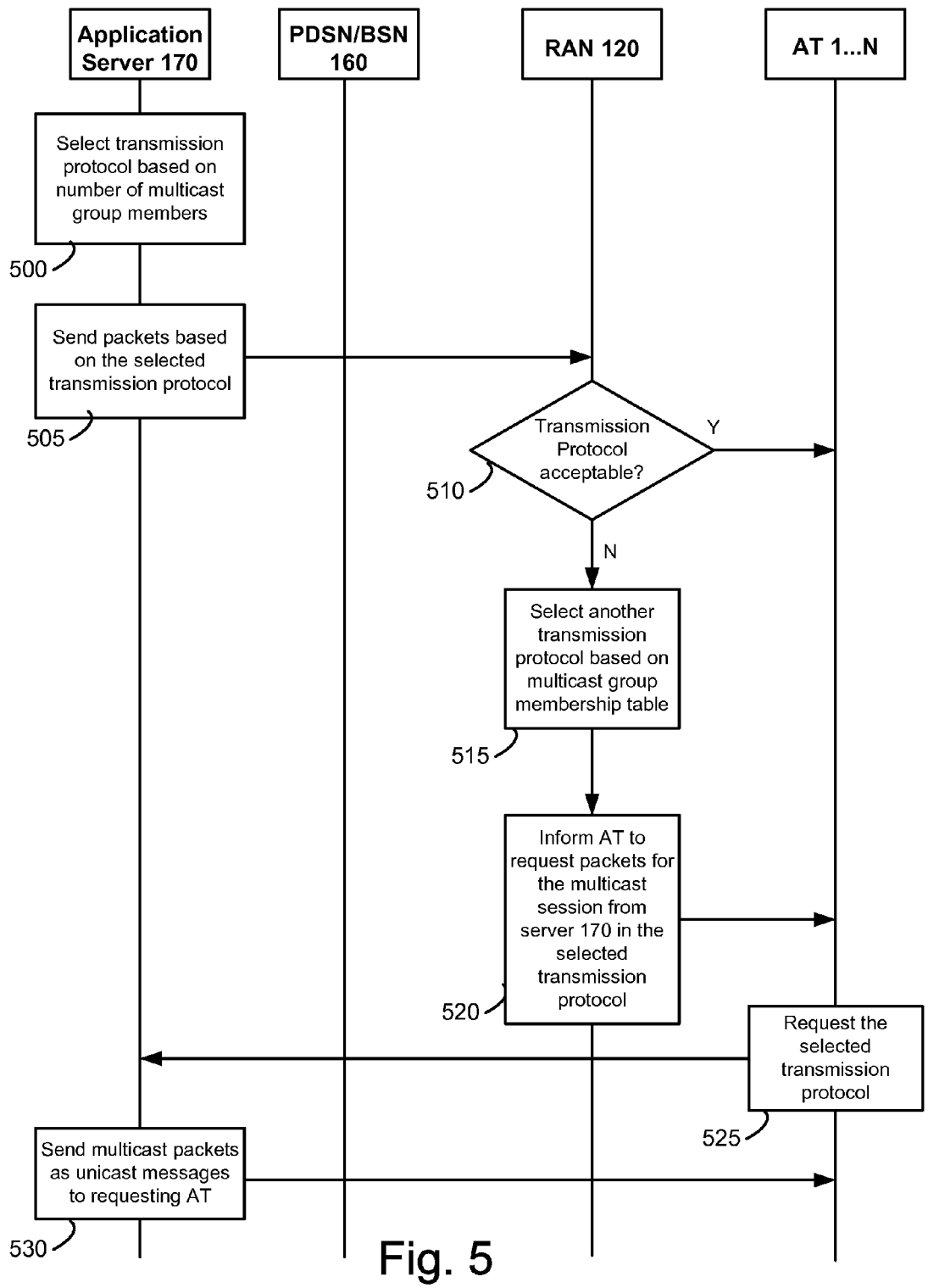
FIG. 5 illustrates a multicast communication process according to an embodiment of the invention.

FIG. 5 illustrates a multicast communication process according to an embodiment of the invention. With regard to FIG. 5, it is assumed that the RAN 120 maintains a table (e.g., a "multicast group membership table") indicating the multicast group association of access terminals being served. The multicast group membership table can either include actual locations of one or more multicast group members (e.g., if the group members are actively communicating with the RAN or have very recently sent a location update), or alternatively can include location estimates (e.g., if one or more group members previously indicated their respective location, but the indicated location is not necessarily still accurate). The multicast group membership table can be specific to a particular BSC, or alternatively can be "global" for all BSCs. The RAN 120 does not maintain a table indicating group associations of access terminals because the RAN 120 is typically unaware of the IP and upper layer functionalities (e.g., IP multicast group membership). Thus, multicast group membership tables are conventionally maintained at the application server 170, and not the RAN 120. However, a multicast group membership table can be maintained at the RAN 120 in at least one embodiment of the invention, for example, as described within co-pending U.S. patent application Ser. No. 12/339,929 by the inventors of the subject application and filed on the same date as the subject application, entitled "MANAGING A MULTICAST GROUP MEMBERSHIP TABLE AT AN ACCESS NETWORK WITHIN A WIRELESS COMMUNICATIONS SYSTEM", and which is hereby incorporated by reference in its entirety. While the above-noted application incorporated by reference describes particular methodologies of generating and maintaining a multicast group membership table at the RAN 120, embodiments of the invention are not limited to the particular methodology described therein. Rather, embodiments of the invention can be directed to scenarios where a multicast group membership table at the RAN 120 is generated in any well-known manner.

Accordingly, in 500, the application server 170 selects a transmission protocol for an announced multicast session. As discussed above with respect to 410 of FIG. 4, the transmission protocol is selected based on a current, total number of multicast group members within the multicast group. For example, if the number of multicast group members is below a pre-defined threshold, the application server 170 selects unicasting as a transmission protocol. Alternatively, if the number of multicast group members is equal to or above the pre-defined threshold, the application server 170 selects multicasting as a transmission protocol.

For convenience of explanation, assume that the application server 170 selects multicasting as the transmission protocol in 500. Accordingly, in 505, the application sends one or more multicast packets to the PDSN/BSN 160, and the PDSN/BSN 160 sends the one or more multicast packets to the RAN 120 via a BCA10 connection.

Instead of merely transmitting the multicast packets in accordance with the selected transmission protocol as instructed by the application server 170, the RAN 120 determines whether the transmission protocol selected by the application server 170 is acceptable for transmission to all multicast group members, 510. In an example, the determination of 510 can be based on (i) multicast group associations of multicast group members for a given multicast group as indicated in the multicast group membership table maintained at the RAN 120, and (ii) the locations (e.g., geographic locations or regions, a more generalized coverage area associated with a serving base station, etc.) of the multicast group members (e.g., as maintained at the RAN 120). In an example, the RAN 120 checks the list of multicast group members within the multicast group associated with the multicast communication from 505, and then checks the locations separately maintained at the RAN 120 to determine the locations of the multicast group members. This information can then be used to determine whether a transmission protocol is acceptable for the multicast group members. For example, if the number of multicast group members within a given region (e.g., a coverage area of a base station, a sector, a pre-defined geographic region, etc.) is below a multicast threshold, the RAN 120 selects unicasting, and if the number of multicast group members is not below the multicast threshold, the RAN 120 selects multicasting. It will be appreciated that the multicast threshold is not necessarily related to the pre-defined threshold used by the application server 170 because the pre-defined threshold is based only upon the total number of multicast group members, wherein the multicast threshold is based upon the number of multicast group members within particular regions.

In a further example, assume that the determination of 510 is sector-specific, and that the RAN 120 enforces a multicast threshold per-sector of four (4), such that unicast protocols are to be used in sectors including at least one and less than four multicast group members. Under these assumptions, reference will now be made to FIG. 6.

Figure 6:
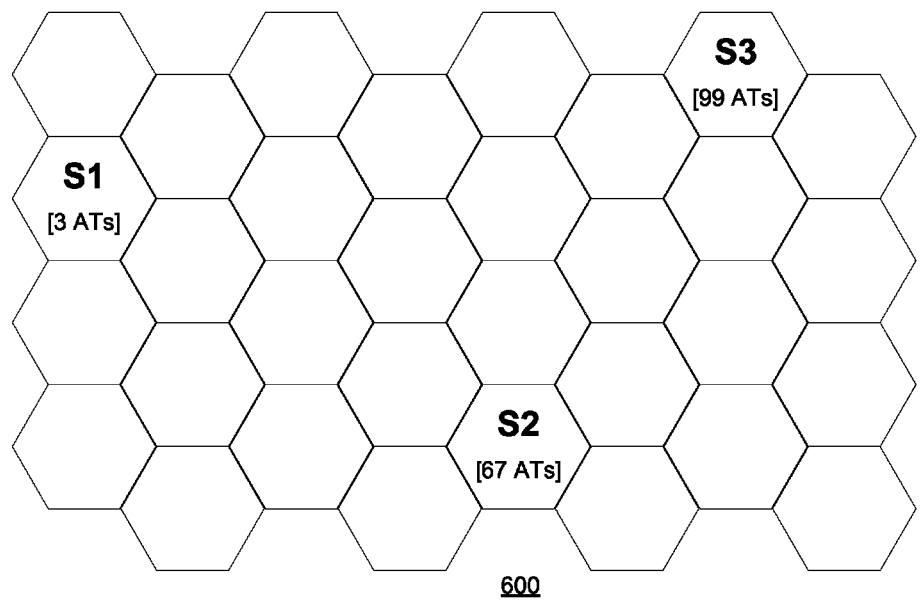
FIG. 6 illustrates a wireless communications system according to an embodiment of the invention.

FIG. 6 illustrates a wireless communications system 600 including a plurality of sectors. In particular, sectors S1 and S2 and S3 include 3, 67 and 99 multicast group members, respectively, participating in a given multicast session. Accordingly, in 510, the RAN 120 determines that multicasting is acceptable within sectors S2 and S3, and that multicasting is not acceptable within sector S1 (e.g., based at least in part on the multicast group membership table and a separate access terminal location table or database maintained at the RAN 120, as mentioned above). For sectors S2 and S3, the RAN 120 transmits the multicast packet(s) via multicasting transmission protocols as previously selected by the applications server 170 in 500. With regard to sector S1, however, the process advances to 515, which will now be described in greater detail.

Returning to FIG. 5, in 515, the RAN 120 selects another transmission protocol for multicast group members associated with unacceptable transmission protocols. Returning to the example of FIG. 6, the RAN 120 determined in 510 that multicasting is not acceptable within sector S1 because sector S1 included fewer multicast group members (i.e., 3) than the per-sector multicast threshold (i.e., 4). Accordingly, in this example, the RAN 120 selects unicasting, instead of multicasting, in 515.

Next, in 520, the RAN 120 informs each multicast group member for which the application server's 170 selected transmission protocol is not acceptable of the alternative transmission protocol selection made by the RAN 120 in 515. Returning to the example of FIG. 6, the RAN 120 informs the three (3) multicast group members within sector S1 that unicast messaging protocols are to be used to facilitate the multicast session in sector S1.

The step of informing the multicast group members of the RAN-selected transmission protocol acts as a prompt for those multicast group members to request the RAN-selected transmission protocol from the application server 170. Accordingly, in 525, each multicast group member informed of the RAN-selected transmission protocol requests the RAN-selected transmission protocol from the application server 170. Returning to the example of FIG. 6, each of the three multicast group members within sector S1 sends a request to receive unicast messages in support of the multicast session in 525.

Upon receiving the request to change transmission protocols at the application server 170, the application server 170 transitions to the RAN-selected transmission protocol for the requesting ATs, and thereafter sends packets in accordance with the RAN-selected transmission protocol, 530. The RAN 120 receives the packets in accordance with the RAN-selected transmission protocol, and transmits the packets with the RAN-selected transmission protocol, 530. Thus, in the example of FIG. 6, the application server 170 sends messages associated with the multicast session as unicast messages to the three multicast group members within sector S1.

In the above-described embodiment of FIG. 5, the RAN 120 enforces its transmission protocol selection of 515 by prompting multicast group members to request a transmission protocol change from the application server 170. While this allows the application server 170 to maintain awareness of how packets associated with a multicast session are actually being transmitted, it will be appreciated that an increased amount of traffic is required to facilitate the transmission protocol change (i.e., steps 520 and 525 of FIG. 5). In another embodiment of the invention, the RAN 120 can map the received packets sent in accordance with a first transmission protocol selected by the application server 170 to a second transmission protocol selected by the RAN 120 dynamically at the RAN 120, such that the application server 170 need not change the manner (i.e., transmission protocol) in which the packets are sent, as will now be described with reference to FIG. 7.

Figure 7:
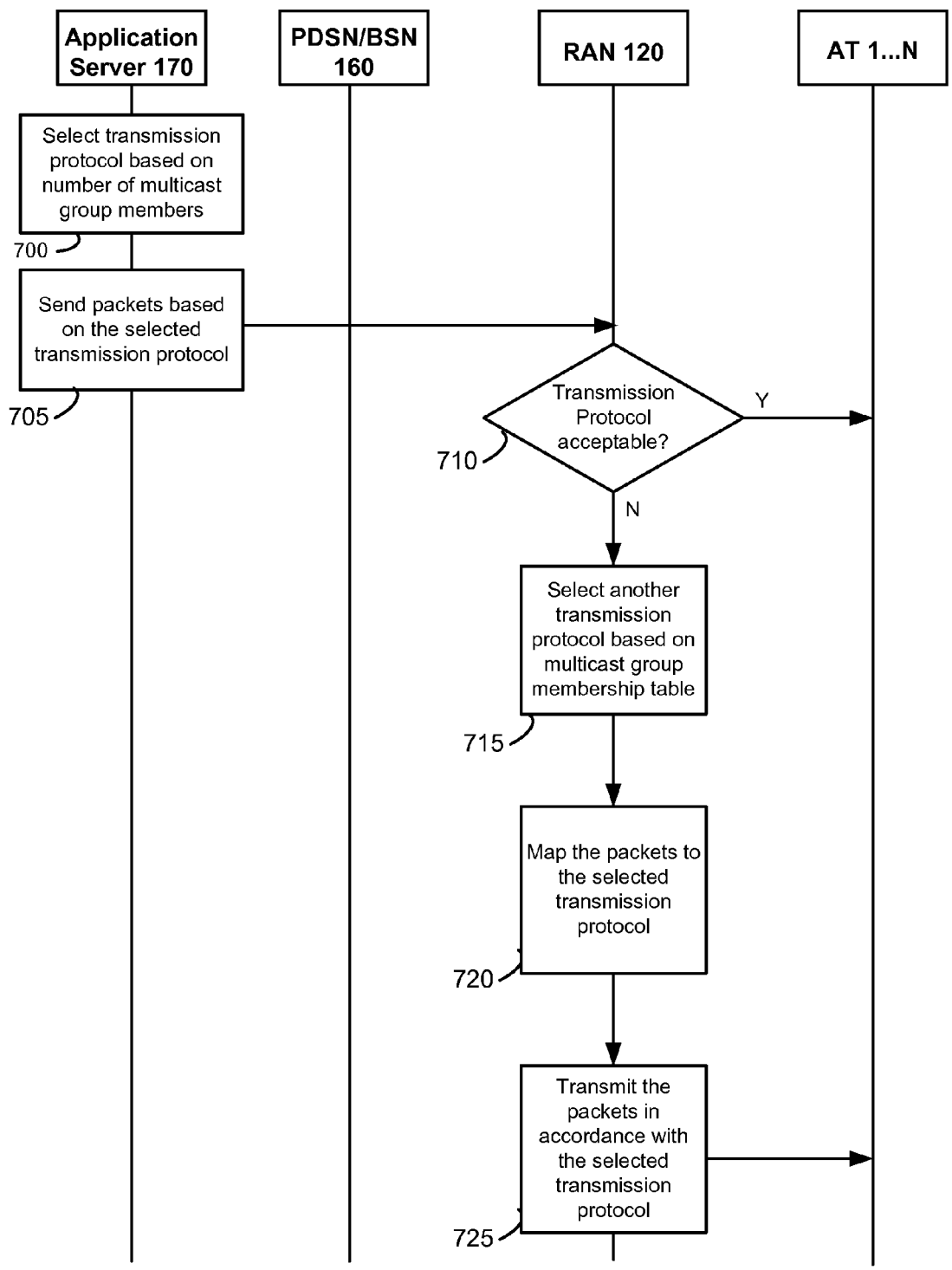
FIG. 7 illustrates a multicast communication process according to another embodiment of the invention.

Referring to FIG. 7, steps 700 through 715 generally correspond to steps 500 through 515 as described above with respect to FIG. 5. Accordingly, these steps will not be described further for the sake of brevity.

In 720, after the RAN 120 selects an alternative transmission protocol for transmitting packets associated with a multicast session to one or more multicast group members, the RAN 120 maps the packets received from the application server 170 in a first transmission protocol to a second transmission protocol as selected by the RAN 120 in 715. For example, if the first transmission protocol is multicasting, and the second transmission protocol is unicasting (e.g., within one or more sectors), the RAN 120 converts the multicast packet into one or more unicast packets in 720. With reference to the example of FIG. 6, the RAN 120 converts the received multicast packet into three separate unicast packets for each of the multicast group members within sector S1. For example, this conversion can be performed by sending the multicast packet over the individual unicast traffic channels (TCHs) for each of multicast group members within sector S1. After mapping the packet from the first transmission protocol to the second transmission protocol, the RAN 120 transmits the packet in accordance with the second transmission protocol.

As will be appreciated by one of ordinary skill in the art, an efficiency of group (e.g., multicast) communications may be improved in embodiments of the invention because the RAN 120 can be configured to make dynamic transmission protocol decisions based on detailed multicast group member location information which is not typically available at the application server 170. Accordingly, overhead associated with multicast communications, which are sent over a broadcast channel (BCH), can be reduced in certain instances (e.g., where the RAN 120 determines a low number of group members to be within a given geo-location), in favor of establishing one or more unicast traffic channels (TCHs) for unicasting the multicast communications. Further, while reference is generally made above to "multicast" communications, it will be appreciated that multicasting is intended to refer to any type of group communication in embodiments of the invention. Accordingly, if the application server 170 transmits separate redundant, unicast messages to different ATs in 530, the communication may still be referred to as a multicast communication as used herein, with the manner of transmission in support of the multicast communication being unicast instead of multicast.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing group communications within a wireless communications system, comprising:
   receiving a forward link packet having a multicast transmission protocol, the forward link packet associated with a multicast group communication session;
   determining whether the multicast transmission protocol is acceptable within a serving area of a base station in an access network based on whether a number of geographically co-located multicast group members participating in the multicast group communication session from within the serving area of the base station is below a multicast threshold; and transmitting the forward link packet to the multicast group members in the serving area of the base station in accordance with a unicast transmission protocol in response to determining that the number of multicast group members participating in the multicast group communication session from within the serving area of the base station is below the multicast threshold.

2. The method of claim 1, wherein the multicast transmission protocol is selected at an application server supporting the multicast group communication session.

3. The method of claim 2, further comprising:

prompting, after determining that the multicast transmission protocol is not acceptable within the serving area of the base station, the multicast group members participating in the multicast group communication session from within the serving area of the base station to request that the application server transmit packets associated with the multicast group communication session in accordance with the unicast transmission protocol.

4. The method of claim 3, further comprising:

receiving, from the application server and in response to the prompting, the forward link packet in accordance with the unicast transmission protocol, wherein the transmitting transmits the forward link packet received in response to the prompting.

5. The method of claim 1, further comprising:

mapping, at the access network, the forward link packet having the multicast transmission protocol to the unicast transmission protocol, wherein the transmitting is performed in response to the mapping.

6. The method of claim 5, wherein the mapping generates unicast versions of the received forward link packet, and wherein a given unicast version of the forward link packet is sent via the unicast transmission protocol to each multicast group member participating in the multicast group communication session from within the serving area of the base station.

7. The method of claim 1, wherein the determining determines the multicast transmission protocol to be acceptable based on (i) a group membership table maintained at the access network, the group membership table indicating the multicast group members participating in or expected to participate in the multicast group communication session, and (ii) locations of the multicast group members participating in the multicast group communication session.

8. The method of claim 1, wherein the determining determines that the multicast transmission protocol is acceptable within the serving area of the base station if the number of geographically co-located multicast group members participating in the multicast group communication session within the serving area of the base station equals or exceeds the multicast threshold.

9. The method of claim 8, wherein the serving area of the base station is one or more sectors of the wireless communications system and wherein the multicast threshold is a per-sector multicast threshold.

10. The method of claim 8, further comprising:

transmitting the forward link packet in accordance with the multicast transmission protocol in regions where the number of multicast group members participating in the multicast group communication session equals or exceeds the multicast threshold.

11. The method of claim 1, wherein the transmitting step transmits the forward link packet in accordance with the unicast transmission protocol only within regions where the number of multicast group members participating in the multicast group communication session is below the multicast threshold.

12. An access network, comprising a processor having:

logic configured to receive a forward link packet having a multicast transmission protocol, the forward link packet associated with a multicast group communication session;

logic configured to determine whether the multicast transmission protocol is acceptable within a serving area of a base station in the access network based on whether a number of geographically co-located multicast group members participating in the multicast group communication session from within the serving area of the base station is below a multicast threshold; and logic configured to transmit the forward link packet to the multicast group members in the serving area of the base station in accordance with a unicast transmission protocol in response to the logic configured to determine determining that the number of multicast group members participating in the multicast group communication session from within the serving area of the base station is below the multicast threshold.

13. The access network of claim 12, wherein the multicast transmission protocol is selected at an application server supporting the multicast group communication session.

14. The access network of claim 13, further comprising:

logic configured to prompt, after the logic configured to determine determines that the multicast transmission protocol is not acceptable within the serving area of the base station, the multicast group members participating in the multicast group communication session from within the serving area of the base station to request that the application server transmit packets associated with the multicast group communication session in accordance with the unicast transmission protocol.

15. The access network of claim 14, further comprising:

logic configured to receive, from the application server and in response to the prompt, the forward link packet in accordance with the unicast transmission protocol, wherein the logic configured to transmit transmits the received forward link packet received in response to the prompt.

16. The access network of claim 12, further comprising:

logic configured to map the forward link packet having the multicast transmission protocol to the unicast transmission protocol, wherein the logic configured to transmit transmits based on a mapping from the logic configured to map.

17. The access network of claim 12, wherein the logic configured to determine determines that the multicast transmission protocol is acceptable within the serving area of the base station if the number of geographically co-located multicast group members participating in the multicast group communication session within the serving area of the base station equals or exceeds the multicast threshold.

18. An access network, comprising:

means for receiving a forward link packet having a multicast transmission protocol, the forward link packet associated with a multicast group communication session;

means for determining whether the multicast transmission protocol is acceptable within a serving area of a base station in the access network based on whether a number of geographically co-located multicast group members participating in the multicast group communication session from within the serving area of the base station is below a multicast threshold; and means for transmitting the forward link packet to the multicast group members in the serving area of the base station in accordance with a unicast transmission protocol in response to the determining means determining that the number of multicast group members participating in the multicast group communication session from within the serving area of the base station is below the multicast threshold.

19. The access network of claim 18, wherein the multicast transmission protocol is selected at an application server supporting the multicast group communication session.

20. The access network of claim 19, further comprising:
means for prompting, after the means for determining determines that the multicast transmission protocol is not acceptable, the multicast group members participating in the multicast group communication session from within the serving area of the base station to request that the application server transmit packets associated with the multicast group communication session in accordance with the unicast transmission protocol.

21. The access network of claim 20, further comprising:
means for receiving, from the application server and in response to the prompt, the forward link packet in accordance with the unicast transmission protocol,
wherein the means for transmitting transmits the forward link packet received in response to the prompt.

22. The access network of claim 18, further comprising:
means for mapping the forward link packet having the multicast transmission protocol to the unicast transmission protocol,
wherein the means for transmitting transmits based on a mapping from the means for mapping.

23. The access network of claim 18, wherein the means for determining determines that the multicast transmission protocol is acceptable within the serving area of the base station if the number of geographically co-located multicast group members participating in the multicast group communication session within the serving area of the base station equals or exceeds the multicast threshold.

24. A non-transitory computer-readable medium including program code stored thereon, the program code configured to operate within an access network of a wireless communications system, comprising:
program code to receive a forward link packet having a multicast transmission protocol, the forward link packet associated with a multicast group communication session;
program code to determine whether the multicast transmission protocol is acceptable within a serving area of a base station in the access network based on whether a number of geographically co-located multicast group members participating in the multicast group communication session from within the serving area of the base station is below a multicast threshold; and program code to transmit the forward link packet to the multicast group members in the serving area of the base station in accordance with a unicast transmission protocol in response to the program code to determine determining that the number of multicast group members participating in the multicast group communication session from within the serving area of the base station is below the multicast threshold.

25. The non-transitory computer-readable medium of claim 24, wherein the multicast transmission protocol is selected at an application server supporting the multicast group communication session.

26. The non-transitory computer-readable medium of claim 25, further comprising:
program code to prompt, after the program code to determine determines that the multicast transmission protocol is not acceptable, the multicast group members participating in the multicast group communication session from within the serving area of the base station to request that the application server transmit packets associated with the multicast group communication session in accordance with the unicast transmission protocol.

27. The non-transitory computer-readable medium of claim 26, further comprising:
program code to receive, from the application server and in response to the prompt, the forward link packet in accordance with the unicast transmission protocol,
wherein the program code to transmit transmits the received forward link packet received in response to the prompt.

28. The non-transitory computer-readable medium of claim 24, further comprising:
program code to map the forward link packet having the multicast transmission protocol to the unicast transmission protocol,
wherein the program code to transmit transmits based on a mapping from the program code to map.

29. The non-transitory computer-readable medium of claim 24, wherein the program code to determine determines that the multicast transmission protocol is acceptable within the serving area of the base station if the number of geographically co-located multicast group members participating in the multicast group communication session within the serving area of the base station equals or exceeds the multicast threshold.

* * * * *